Dec. 18, 1962  J. M. PETRO  3,068,962
COLLAPSIBLE WHEEL CHOCK
Filed April 14, 1961  2 Sheets-Sheet 1

INVENTOR
JAMES M. PETRO
BY Walter Fenca
ATTORNEY

Dec. 18, 1962 J. M. PETRO 3,068,962
COLLAPSIBLE WHEEL CHOCK
Filed April 14, 1961 2 Sheets-Sheet 2
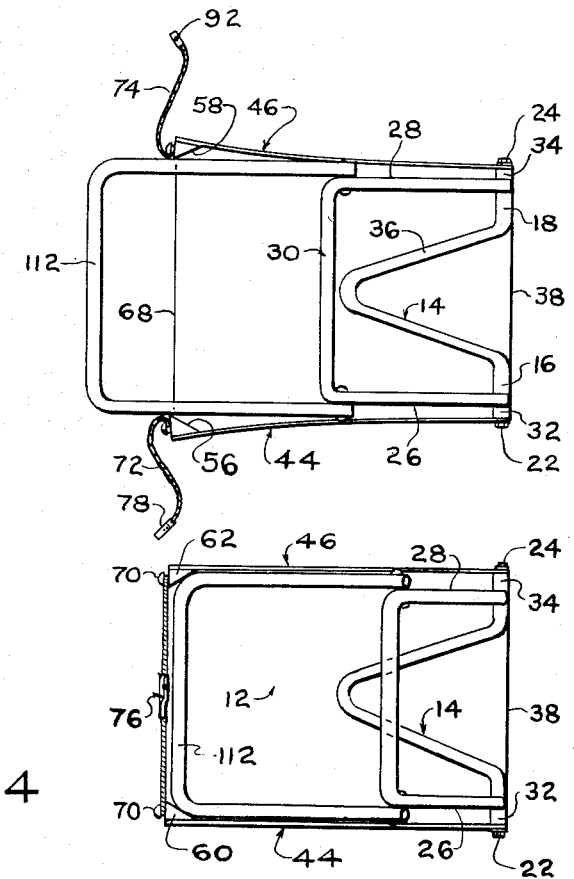
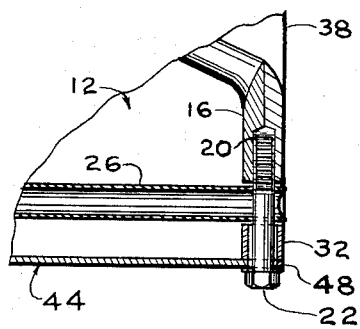
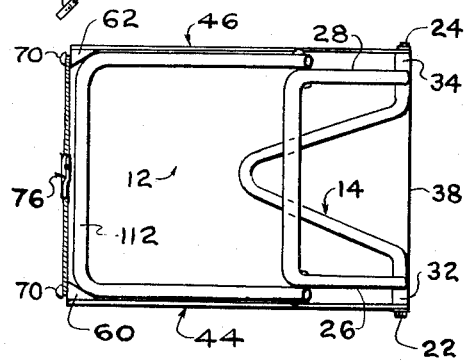
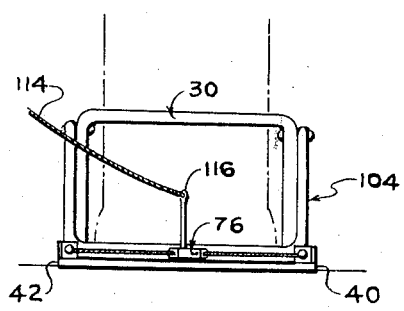
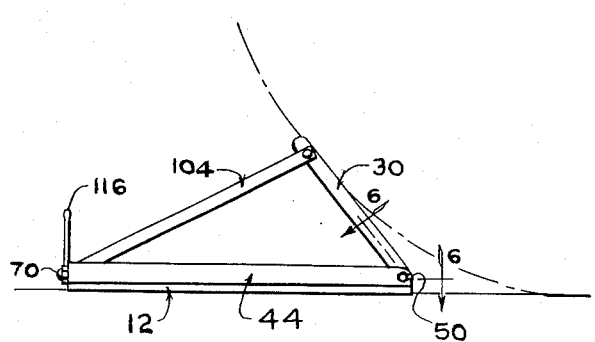
INVENTOR
JAMES M. PETRO
BY Walter Leuca
ATTORNEY United States Patent Office 3,068,962
Patented Dec. 18, 1962

3,068,962
COLLAPSIBLE WHEEL CHOCK
James M. Petro, 6632 Melton Road, Gary, Ind.
Filed Apr. 14, 1961, Ser. No. 103,012
5 Claims. (Cl. 188—32)

The present invention relates generally to a collapsible wheel chock and more particularly to a collapsible wheel chock especially adapted for use with heavy vehicles.

My invention is directed to the problem of removing the restraining support of a wheel chock from the wheel of a heavy vehicle. Conventional collapsible wheel chocks include restraining members which are locked in restraining position by a toggle-like-link or a brace supporting the restraining member against a base member. In order to work the collapse of the restraining member, it is necessary to actually raise the restraining member against the load before a collapse thereof is possible. Though this can be accomplished without inordinate effort when the restrained load is not too great because the resiliency of the tire itself will give sufficiently to allow the raising of the restraining member prior to collapse, however, under heavy loads such as the multi-tone vehicular crafts which are becoming increasingly prevalent in the transportation system, and loads which become firmly set against the restraining member of the wheel chock, the resiliency of the supporting tire will have reached a limit such that the conventional practice employed to work the collapse of a wheel chock by manual effort would be extremely difficult if at all possible.

Accordingly, the principal object of my invention is to provide a wheel chock to restain heavy loads which may be collapsed to accomplish the removal of the restraining support by easy manual application.

Another object of my invention is to provide a wheel chock which is economical and simple to manufacture, dependable and easy to operate.

Figure 1:
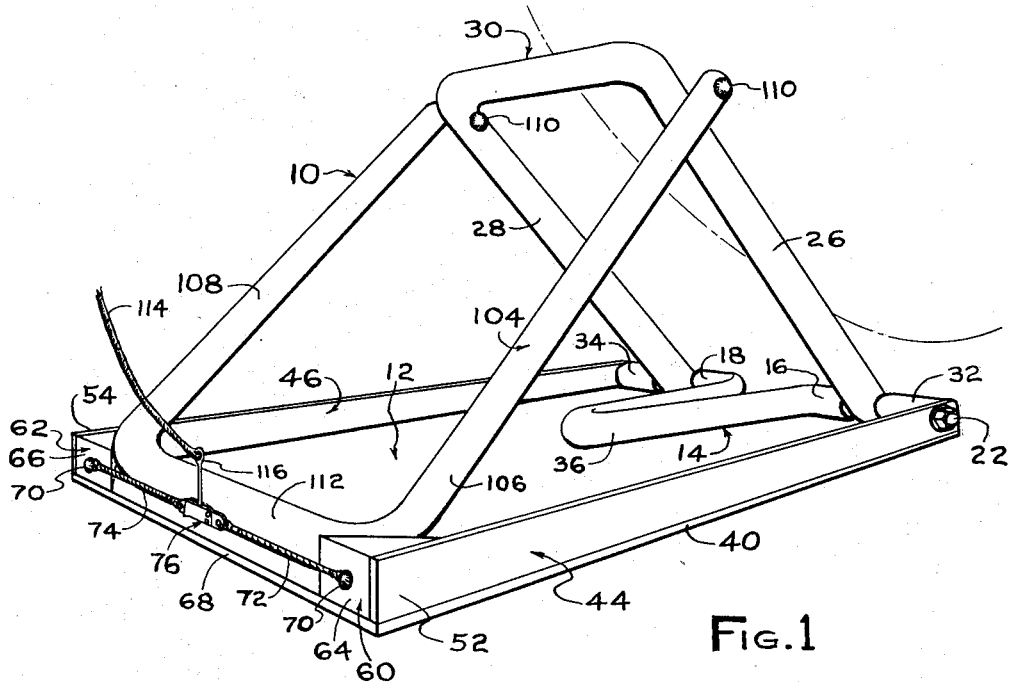
Figure 7:
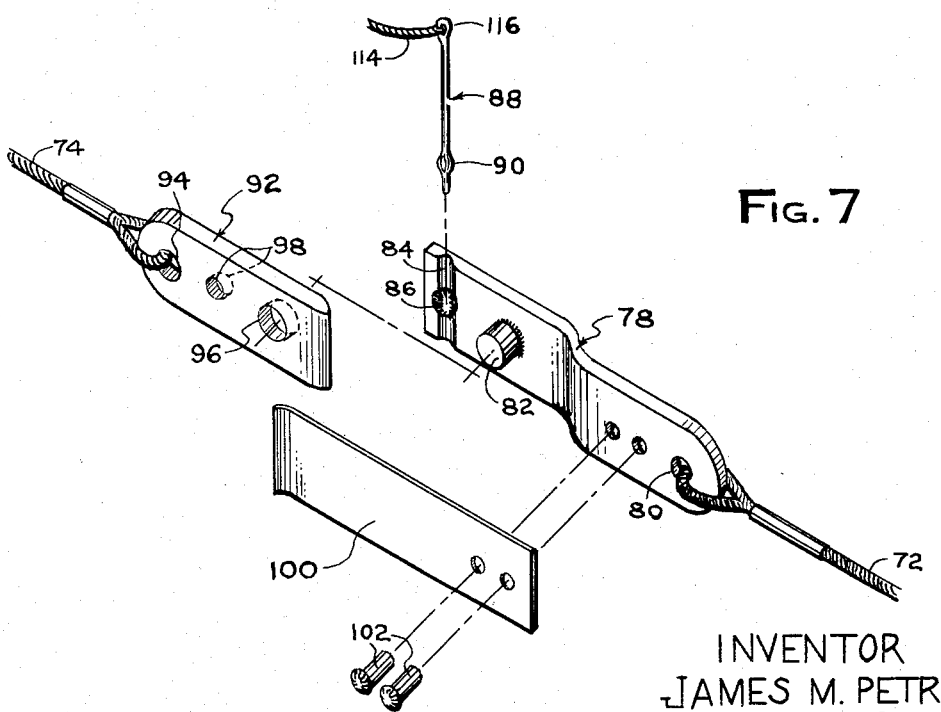

Other objects and advantages will become apparent from a study of the following detailed description of the preferred embodiment of my invention as illustrated in the accompanying drawings in which, FIGURE 1 is a perspective view of the wheel chock of my invention in restraining relation with a wheel portion shown in dotted line, FIGURE 2 is a front elevation of the wheel chock in restraining relation with a wheel portion shown in dotted lines, FIGURE 3 is a side elevation of the device shown in FIGURE 2, FIGURE 4 is a plan elevation of the wheel chock locked in operative position, FIGURE 5 is a plan elevation of the wheel chock shown in collapsed position, FIGURE 6 is a fragmentary sectional view taken on line 6—6 of FIGURE 3 showing the hinge connection of one leg of the restraining member and the base member, and FIGURE 7 is a trimetric view of the locking means of my invention shown in exploded relation.

Referring now to the drawings, the numeral 10 designates the wheel chock generally. Its construction includes a pan or base 12 generally rectangular in plan having welded or otherwise integrally fixed thereto an angled shaft 14 of which the opposed ends 16 and 18 are axially aligned and each provided with a threaded hole 20 which receive bolts 22 and 24 respectively. The shaft portions of bolts 22 and 24 serve as trunnions for the journal or bearing ends of legs 26 and 28 respectively of wheel restraining member 30 and carry tubular spacers 32 and 34 which are fixed against rotational movement to base plate 12 by means of weldments. The angled portion 36 of shaft 14 serves as a stiffener for base 12. The restraining member 30 is preferably made from a tubular piece formed into a U-shaped member. Axially aligned ends 16 and 18 are parallel to the rear edge 38 of base 12 and the outfacing ends of spacers 32 and 34 are short of being coterminous with side edges 40 and 42 respectively of base 12. Secured against said outfacing ends of spacers 32 and 34 by means of the cap or head of bolts 22 and 24 are the ends of side bars 44 and 46 respectively. In this connection I prefer to provide a lug 48 on the end of each spacer 32 and 34 and a matching slot or indent 50 in the ends of side bars 44 and 46, the engagements thereof serve to lock the side bars 44 and 46 and prevent any rotational movement relative to spacers 32 and 34 respectively. Side bars 44 and 46 rest on edge on base 12 immediately adjacent side edges 40 and 42 respectively.

The distal ends 52 and 54 of side bars 44 and 46 respectively are provided with inwardly angled or slanted surfaces 56 and 58. I have shown these surfaces 56 and 58 to be infacing sides of triangular blocks 60 and 62 respectively which I make integral with ends 52 and 54 of side bars 44 and 46 respectively by weldments or other permanent fastening means. The forward facing sides 64 and 66 of triangular blocks 60 and 62 respectively coterminate with the distal ends 52 and 54 of the respective side bars 44 and 46 and the front edge 68 of base 12 and lie in a common plane. The forward facing sides 64 and 66 are each provided with a capped pin 70 projecting therefrom to which are anchored on the shaft portion of the pins 70, wire ropes 72 and 74. It should be understood that the slanted surfaces 56 and 58 and the forward facing sides 64 and 66 may be obtained by angulating the distal ends 52 and 54 of side bars 44 and 46 respectively inwardly and then outwardly to provide said slanted surfaces and forward facing sides.

Locking means, designated generally by numeral 76, is comprised of a hold plate 78 having at one end an aperture 80 to which is secured the free end of rope 72. Integrally formed with hold plate 78 at a distal portion and projecting therefrom is a short boss 82. Plate 78 has a groove 84 extending laterally and adjacent the other end thereof. An enlargement or socket 86 is formed in the groove 84. Said groove 84 receives rod 88 which is also provided with an enlargement 90 so that there be a coincidence of parts of rod 88 in contact with plate 78 at groove 84. Tongue plate 92 has an aperture 94 at one end to which is secured the free end of rope 74. Adjacent the other end of tongue plate 92 is provided a hole 96 into which slidably fits boss 82 when the tongue plate 92 is fitted into position against hold plate 78. Intermediate said ends, a recess 98 is provided in the tongue plate 92 so that upon fitting tongue plate 92 to boss 82, the recess 98 receives the portion of the enlargement 90 of rod 88 which protrudes beyond the planular face of hold plate 78 so that the matching faces of tongue plate 92 and hold plate 78 make a flush joint therebetween. Clasp bar 100 is secured, by means of rivets 102 or other common fasteners, to hold plate 78 and the free end thereof serves as a spring clamp holding tongue plate 92 in position on hold plate 78. I prefer to round or slant the edges of groove 84 of hold plate 78 to facilitate the pivotal movement of rod 88 out of groove 84; and provide a narrow edge on the said other end of tongue plate 92 to facilitate entrance of the tongue plate 92 between hold plate 78 and clasp bar 100.

Brace member 104 is a U-shape member preferably formed from a tubular piece. Parallel legs 106 and 108 are pivotally connected by means of pins 110 to the distal portion of legs 26 and 28 respectively of restraining member 30. The yoke portion 112 of brace member 104 is positioned between side bars 44 and 46 and rests adjacent the forward end 68 of plate 12, abutting against the slanted surfaces 56 and 58 of blocks 60 and 62 respectively.

With the locking means 76 assembled as described above, the wire ropes 72 and 74 will hold the side bars 44 and 46 from springing apart and thereby prevent the brace member 104 from sliding forward when a load is applied to restraining member 30.

To accomplish the collapse of the wheel chock of my invention, a relatively gentle lateral tug is applied to rope 114 at a safely remote distance from the vehicular craft which is being restrained by my wheel chock 10. The end of rope 114 is connected to the lever end 116 of rod 88 and the tug thereon causes the rod 88 to pivot at its enlargement 90 in socket 86 and recess 98 of hold plate 78 and tongue plate 92 respectively. The shaft portions of rod 88 below and above said enlargement 90 are cammed out of the groove 84 and in effect wedge the tongue plate 92 apart from hold plate 78 an amount sufficient to cause said tongue plate to ride off and clear boss 82 on hold plate 78. The locking means is thereby released allowing the side bars 44 and 46 to spring apart due to the transmission of the restrained load to the sloping surfaces 56 and 58 of blocks 60 and 62 respectively and thereby allowing the brace member 104 and restraining member 30 to collapse to the plate 12 as shown in FIGURE 5.

Therefore, according to the principles of my invention as described and illustrated herein, the brace member 104 is securely held in position to support the restraining member 30 against a great load, and when desired may be released to work the collapse of the wheel chock 10 by simply and easily releasing a locking means 76 without working against the load restrained.

Though I have described a single preferred embodiment of the invention, it is realized that changes and modifications may be made in the device by those skilled in the art without departing from the spirit of the invention as set out in the appended claims.

I claim:

1. A collapsible wheel chock comprising a base member, a wheel restraining member having a transverse portion and leg members hinged to said base member for pivotal movement to and from said base member, a brace member having a transverse portion and leg members, one end of said leg members of said brace member pivotally connected to said first named leg members adjacent said transverse portion of said restraining member, the other end of said leg members of said brace member being slidably movable on said base member, opposingly faced side members connected to said base member at one of the ends thereof, the other of the ends of said side members having inwardly projecting abutments for engaging said other end of said leg members movable on said base member, said side members being laterally movable by said leg members movable on said base member, and releasable means connecting the other of the ends of said side members for controlling said lateral movement of said side members.

2. A collapsible wheel chock comprising a base member, a wheel restraining member having a transverse portion and leg members hinged to said base member for pivotal movement to and from said base member, a brace member having a transverse portion and leg members pivotally connected to said leg members of said restraining member adjacent said transverse portion thereof, said transverse portion of said brace member being slidably movable on said base member, opposingly faced side members connected to said base member at one end of said base member, said side members having inwardly projecting abutments at the other end of said side members to provide support means for said brace member at said portion thereof being slidably movable on said base member, rope members connecting said abutments on said side members, plate means on said rope members adapted to releasably connect together to hold said inwardly projecting abutments of said side members in support abutting position for said brace member, and means on said plate means for releasing said connection to allow said abutments to be removed from said support abutting position for said brace member.

3. A collapsible wheel chock comprising a base member, a wheel restraining member having a transverse portion and leg members hinged to said base member for pivotal movement to and from said base member, a brace member having a transverse portion and leg members, one end of said leg members of said brace member pivotally connected to said leg members of said restraining member adjacent the transverse portion thereof, the other end of said leg members of said brace member being slidably movable on said base member, opposingly faced side members connected to said base member at one of the ends of said side members, the other of the ends of said side members having inwardly projecting abutments for engaging said other end of said leg members slidably movable on said base member, rope members connecting at one end thereof said other end of said side members, the other end of said rope members having plate members adapted to connect for longitudinal support, and release means on said plate members adapted to disengage said plate members.

4. A collapsible wheel chock comprising a base member, a base member reinforcing means fixed to said base member, a wheel restraining member having a transverse portion and leg members hinged to said base member reinforcing means, a brace member having a transverse portion and leg members pivotally connected to said first named leg members adjacent said transverse portion of said restraining member, said transverse portion of said brace member being slidably movable on said base member, opposingly faced side members connected to said reinforcing means at one of the ends of said side members, the other of the ends of said side members being free to move outwardly of said base member, the said other of the ends being inwardly angled to provide abutments for said brace member at said transverse portion thereof, rope members connecting said angled ends, plate means on each of said rope members, one of said plate means having a recess, the other of said plate means having a projection to engage said recess to releasably connect said plates together and thereby hold said inwardly angled ends of said side members in support abutting position for said brace member, and camming means between said plate members for releasing said connected plate means to allow said inwardly angled ends of said side members to be removed from said support abutting position for said brace member.

5. The collapsible wheel chock of claim 4 characterized by said base member reinforcing means having axially opposed ends, a trunnion extending from each of said axially opposed ends to pivotally support said leg members of said wheel restraining member, and a side member connected at one of its ends to each of said trunnions.

References Cited in the file of this patent

UNITED STATES PATENTS 2,895,569    Nystrom               July 21, 1959